Nov. 30, 1965   P. A. MADSEN   3,220,667
FISHING REEL UNIT
Filed Nov. 9, 1962
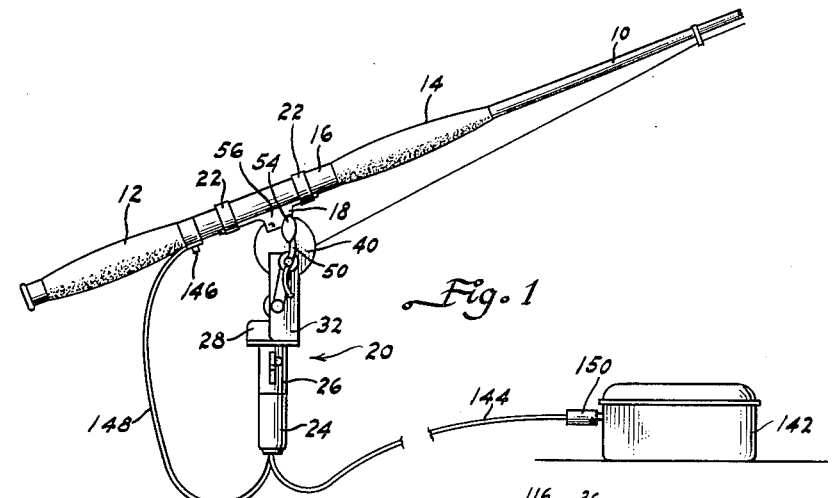
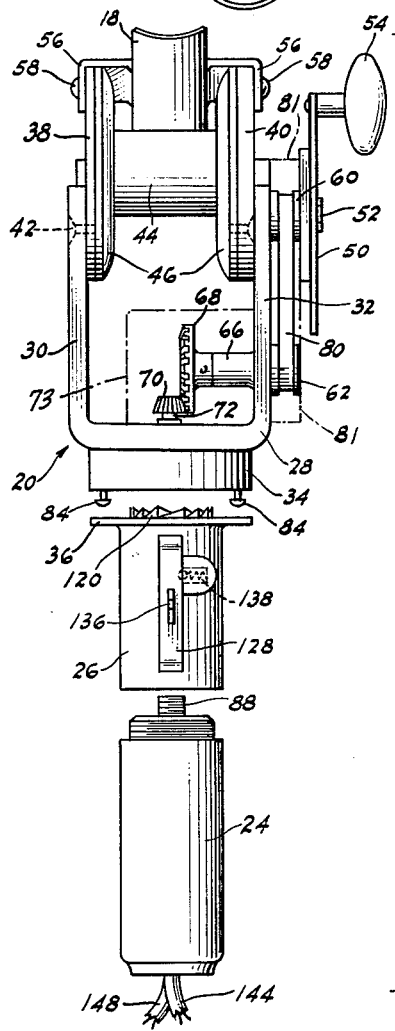
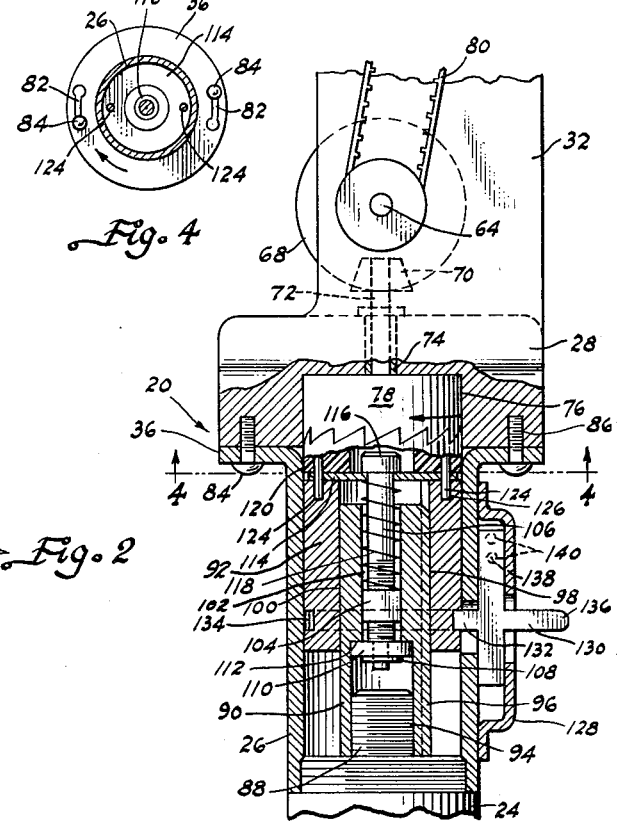
INVENTOR.
PETER A. MADSEN
BY
ATTORNEY United States Patent Office 3,220,667
Patented Nov. 30, 1965

3,220,667
FISHING REEL UNIT
Peter A. Madsen, Tartan Road, P.O. Box 99,
Richboro, Pa.
Filed Nov. 9, 1962, Ser. No. 236,588
11 Claims. (Cl. 242—84.54)

This invention pertains to improvements in fishing reel construction and, more particularly, in the construction of a power-operated fishing reel unit.

Power-operated or power-driven fishing reel units have been devised heretofore but many of these have been of a complicated and expensive nature, while others have been of a cumbersome and heavy nature, so as to render them highly undesirable. In still others, special types of expensive castings and housings, as well as special reels and supporting means therefor, have been required incident to rendering the reels power-operated.

Certain of the power-operated fishing reels devised heretofore also have required the use of special handle constructions on a fishing pole in order to adapt the reel arrangements thereto. Further, many of such prior constructions did not employ suitable safety means such as drive release means of any suitable type for use under circumstances where the pull upon a line exceeded the power capable of being delivered by the motor driving the reel, whereupon either the motor or driving mechanism, or both, were damaged under such circumstances.

It is the principal object of the present invention to provide a power-operated fishing reel unit which readily is capable of being attached to a conventional fishing rod or pole by the normal means employed usually to attach hand-operated reels thereto, the fishing reel unit and power means being compact and simple, yet fully capable of being safely operated without appreciable possibility of damage being sustained by the motor or driving mechanism.

Another object of the invention is to provide in the aforementioned power-operated fishing reel unit relatively simple drive means for the spool of the same and particularly a clutch mechanism of a ratchet nature and capable of yielding when the load upon the line and spool exceeds the power which the motor is capable of delivering, whereby the power of the motor automatically is disconnected from the spool under such circumstances, thereby preventing injury either to the motor or driving mechanism for the spool reel.

A still further object of the invention is to provide in the fishing reel units of the aforementioned type separable supporting means, the parts thereof preferably being effectively connected by quick-detachable means, and the clutch mechanism comprising two relatively engageable ratchet-type members respectively carried by said parts of said supporting mechanism, whereby when said parts are disconnected, the engaged but separable clutch members are separated from each other. Ancillary to this further object of the invention, one of said clutch members preferably is of softer material than the other, whereby it will wear more rapidly than the other clutch member when ratchet operations are required, and said softer clutch member is freely exposed when said support members are disconnected so as readily to permit substitution of a new clutch member for a worn one when necessary, without requiring disconnection of any of the other driving elements or parts of the fishing reel unit.

Details of the foregoing objects and of the invention, as well as other objects thereof, are set forth in the following specification and illustrated in the accompanying drawing comprising part of the same.

In the drawing:

FIG. 1 is an exemplary side elevation of a fragmentarily illustrated handle portion of a heavy type fishing rod to which a power operated fishing reel unit embodying the principles of the present invention is attached, said unit being shown as obtaining its power from an exemplary electric battery.

FIG. 2 is an exploded face view of the power-operated fishing reel unit shown in FIG. 1 but illustrated on a larger scale and at a right angle to the side view of the unit shown in FIG. 1, the separable support means of the unit being shown in separated arrangement in this figure to illustrate one of the exposed clutch members.

FIG. 3 is a fragmentary, partially vertically sectioned view of the driving mechanism and clutch means embodied in the reel unit shown in FIGS. 1 and 2 but shown on a still larger scale than in FIG. 2 so as better to illustrate details comprising essential parts of the invention.

FIG. 4 is a transverse sectional view taken on the line 4—4 of FIG. 3 and employing a smaller scale than in FIG. 3 to illustrate exemplary connecting means for the disengageable supporting means of the reel unit.

Referring to FIG. 1, an exemplary heavy type fishing rod or pole 10 is shown fragmentarily to illustrate preferably the handle end thereof, the latter comprising a pair of longitudinally spaced grips 12 and 14, with a section 16 therebetween to which the concave bracket 18 of the fishing reel unit 20 is attached by conventional rings or ferrules 22, slidable on section 16.

The fishing reel unit 20 preferably is power driven by means of an electric motor 24, which preferably is of a compact but powerful nature. Motor 24 is contained in a suitable exterior housing and is detachably connectable to part of a supporting frame for the unit comprising an extension 26. The main supporting frame 28 preferably is yoke-shaped as best seen in FIG. 2, the same having a pair of transversely spaced opposite arms 30 and 32. The bight portion of the yoke-shaped frame 28 has a boss 34 which preferably is complementary to and engageable with a circular, radial flange 36 at the normally upper end of the extension 26 of the supporting frame to which the motor 24 is connected.

Particularly from FIG. 1, it will be seen that the frame extension 26 is substantially coaxial with the motor 24 and the general longitudinal axis of the main supporting frame 28, whereby the entire fishing reel unit 20 extends substantially in a straight line and preferably at an acute angle from the handle portion of the fishing rod 10 so as to present a minimum of obstuction to the handling of the rod by the fisherman. Especially when the rod is held with the fishing reel unit 20 depending therefrom, as shown in FIG. 1, no force is required on the part of the fisherman to resist turning of the rod in his hand about the axis thereof for example, whereby the fishing reel unit 20 tends to serve somewhat as a stabilizing means to prevent rotation of the pole due to the effect of gravity imposed by said unit upon the rod 10.

One advantage of the main supporting frame structure 28 of the present invention comprises the fact that it is of such nature that, preferably, it can readily be attached to a conventional fishing reel frame having opposite frame plates 38 and 40 to which the upper ends of the arms 30 and 32 of the yoke-shaped supporting frame 28 respectively are connected by any suitable means such as screws 42, whereby the frame plates 38 and 40, in effect, comprise extensions of the arms 30 and 32 of frame 28 as to the present invention.

The substantially conventional spool 44 is mounted for rotation about a fixed axis extending between the frame plates 38 and 40, the same comprising a conventional spool shaft, not shown in detail, such as employed in a conventional fishing reel unit. The spool has end flanges 46 connected to opposite ends of the hub thereof for receiving therebetween a coiled fishing line 48 which is shown in FIG. 1 as extending from the spool outwardly along the rod 10.

Rotatably carried by the arm 32 of frame 28 is a conventional manual crank 50 which is rotatable about the axis of the connecting bolt 52, the crank having a conventional hand knob 54 thereon. The bolt 52 is connected to one of a number of meshing reduction gears, not shown, but disposed within a suitable cavity between the frame plates 38 and 40 and the adjacent end flange 46 of spool 44, in accordance with conventional practice. By such means, the spool 44 may be rotated manually when desired.

The concave bracket 18 has side extensions 56 which are interconnected to the main frame 28 through any suitable means such as by being directly connected to the frame plates 38 and 40, such as by screws 58. Thus, when the bracket 18 is connected to the section 16 of the handle portion of fishing rod 10, it will be seen that the entire fishing reel unit 20 is rigidly supported by the handle section of the fishing pole.

The drive mechanism for the spool 44, when it is desired to drive the same by the power furnished by the electric motor 24, is best illustrated in detail in FIGS. 2 and 3. Said drive mechanism comprises a pulley 60 connected to the inner side of handle 50, for example, and operable to drive the handle when the pulley is rotated. A priving pulley 62 is mounted upon one end of a shaft 64, see FIG. 3, which is rotatably supported within a bearing boss 66 carried by the arm 32 of frame 28. Connected to the opposite end of said shaft 64 is a bevel gear 68 which meshes with and is substantially larger in diameter than a bevel pinion 70 which is connected to the upper end of a rotatable shaft 72 mounted in bearing 74 positioned within a suitable bore formed in the bight portion of supporting frame 28. Gear 68 and pinion 70 may be covered suitably by an appropriate removable cover 73, outlined in broken lines in FIG. 2, if desired.

The bearing 74 is coaxial with an interior recess 76 which is circular in cross-section and receives a clutch member 78 which is connected to the inner end of shaft 72 by any suitable means capable of rendering the same non-rotatable relative to said shaft. Clutch member 78 is a driven member which, through the means of pinion 70 and bevel gear 68 drives pulley 62 which is connected by a suitable flexible, endless friction belt 80 which extends around the driving pulley 62 and the driven pulley 60 so as to rotate the spool 44 through the means of the conventional reduction gearing between frame plates 38 and 40 and adjacent end flanges 46 as referred to above. If desired, suitable small sprocket gears and a sprocket chain may be substituted for the pulley 60 and 62 and belt 80, within the spirit of the invention. Also, if desired, a suitable kind of housing 81, outlined in broken lines in FIG. 2 may be provided to enclose such driving mechanism.

As indicated above, the extension 26 of the supporting frame 28 is detachably connected to the lower end of main supporting frame 28, preferably by manually operable, quick detachable means of any suitable type, one exemplary type being illustrated in plan view in FIG. 4 and comprising a pair of arcuate key-hole slots 82 which are arranged to receive the heads 84 of a pair of securing screws 86 carried by the lower end of boss 34 on main frame 28. It will be apparent that by inserting the heads 84 of the screws 86 through the large ends of the keyhole slots 82 and then rotating the extension 26 in the direction of the arrow shown in FIG. 4, effective connection of the extension 26 to the main frame 28 is achieved. Said direction also is the same as that of rotation of motor shaft 88, thus insuring such connection during operation of the unit.

Referring particularly to FIG. 3, it will be seen that the motor 24 has a drive shaft 88 projecting from the upper end thereof, the same being secured suitably to a drive shaft assembly comprising coaxial and longitudinally movable members consisting of an inner shaft 90 and an outer sleeve or bushing 92 which is cylindrical in cross-section. The lower end of inner shaft 90, as viewed in FIG. 3, is centrally hollow and is secured non-rotatably to the drive shaft 88 of the motor 24, by any suitable means such as threads 94, a set screw (not shown), or otherwise. Secured externally to inner shaft 90 is a spline 96 which is received within a complementary, longitudinal groove 98 formed in the wall of the inner bore 100 of outer sleeve 92, whereby the latter is rendered non-rotatable relative to the inner shaft 90 and thus is rotated by the drive shaft 88 of motor 24.

The upper portion of inner shaft 90 has a central longitudinal opening 102 therethrough which is square in cross-section, the same slidably receiving a square nut 104, the internal threads of which receive the threaded lower end of bolt 106. The lower or inner end of bolt 106 is provided with a snap ring 108 which abuts against a disc 110 which is fixed, such as by press-fitting or otherwise, within the lower central bore of the inner shaft 90. Said inner bore is of a greater diameter than the cross-section dimension of the longitudinal opening 102 which is square in cross-section, whereby a shoulder is provided at the upper end of the lower and larger central bore to provide a seat 112 for disc 110.

Abutting the upper end of outer sleeve 92 is another disc 114, the head 116 of bolt 106 abutting the upper surface of disc 114 so as to hold it positioned against sleeve 92, whereby the bolt 116 is rotatable relative to the drive shaft assembly comprising inner shaft 90 and outer sleeve 92 but is not removable axially relative thereto due to the inner end of the bolt 106 being swiveled rotatably relative to disc 110 which is abutted on its lower surface by snap ring 108 connected to bolt 106.

Surrounding bolt 106 and normally in compression between square nut 104 and disc 114 is a spring 118 which normally tends to urge the disc 114 against the head 116 of bolt 106. Directly abutting the upper surface of disc 114 is a second clutch member 120 which is complementary to the clutch member 78 which drives the spool 44. Preferably, the clutch member 120 is made, such as by molding, from softer material than the clutch member 78. For example, clutch member 120 may be molded from a suitable synthetic resin or relatively soft metal such as bearing metal, whereas clutch member 78 may be molded or machined from a suitable hard metal such as steel or bronze which is harder than the resin or soft metal from which the clutch member 120 is formed, whereby when slippage occurs between the two ratchet members as described hereinafter, the greater wear will be sustained by the clutch member 120 and especially the serrated teeth 122 on the upper face thereof which are complementary to similar serrated teeth on the lower face of clutch member 78.

Molded within or otherwise suitably secured to the clutch member 122 are, preferably, at least a pair of key means comprising exemplary pins 124 which extend through suitable openings in disc 114 and also into holes 126 formed in the upper end of outer sleeve 92 of the drive shaft assembly. Thus, when the drive shaft assembly rotates, clutch member 120 will be driven thereby, in the direction of the arrow shown therein in FIG. 3 for example, and due to the pressure exerted by spring 118 against disc 114, which pressure is transmitted to clutch member 120, the latter is forced against clutch member 78 sufficiently that even though the slope of the complementary surfaces of clutch teeth 122 on the clutch member is in a direction normally to cam the clutch members into separation, driving of the clutch member 78 is effected and, correspondingly, the spool 44 is driven thereby through the medium of the bevel gear and pin 68 and 70, pulleys 60 and 62, belt 80, and the other driving mechanism between the pulley 60 and spool 44.

Preferably, a small housing 128, positioned on the exterior of frame extension 26, contains an actuating member 130 which normally maintains the sleeve 92 and correspondingly, driving clutch member 120, in driving relationship with driven clutch member 78. To accomplish this, the actuating member 130 has a detent 132 received within an annular groove 134 in sleeve 92. Finger piece 136 projects beyond the housing 128 for purposes of manually actuating the member 130. As best seen in FIG. 2, the housing 128 also contains a spring pressed ball or detent 138 which is received within one of a pair of dimples 140 formed in one side of the member 130. One of said dimples receives the ball 138, as shown in FIG. 3, to maintain the actuating member 130 in position to hold the clutch member 120 "On" or in operative position.

In the event the fishing line 48 is subjected to a pull in excess of that which safely can be sustained by the driving mechanism, the pressure afforded by spring 118 against driving clutch member 120 is such that said pressure may be overcome while said driving clutch member continues to be rotated by motor 24, whereby the driven clutch member 78 will remain substantially stationary due to the tension forced imposed upon fishing line 48, causing a camming or ratchet action to take place between driving clutch member 120 and driven clutch member 78, thereby forcing sleeve 92 axially inward and, under such circumstances, the pressure exerted by spring pressed ball 138 is such that it can be overcome, whereby the actuating member 130 is moved to the non-operative position which is below that illustrated in full lines in FIG. 3, and the upper dimple 140, as viewed in FIG. 3, will receive the spring pressed ball 138 of the retaining means for actuating member 130. During the downward or inward movement of driving clutch member 120 however, the bolt 106 remains axially unmoved, whereby the same will act as a stop member to limit axially upward movement of sleeve 92 when the same is restored to "On" or operative position by actuation of member 130.

One of the highly advantageous aspects of the present invention comprises the fact that when motor 24 and frame extension 26 are detached from main frame 28, one of the pair of complementary clutch members respectively remain with the main frame 28 and the extension 26 as readily is shown in FIG. 2. Further, it will be seen in said figure that the driving clutch member 120, which is more expendable than driven clutch member 78 for example, is readily exposed so as to be quickly removable from the drive shaft assembly contained within frame extension 26, particularly when the clutch member 120 has been worn beyond further use through wear caused by repeated ratchet action or otherwise. Hence, it will be seen that not only may the frame extension 26 and the mechanism contained therein be disconnected quickly from the main frame 28, due particularly to the quick detachable connecting means 82 and 84, but the most expandable and wear-sustaining element of the drive mechanism, namely, the driving clutch member 120, readily may be removed and replaced by a new one within a matter of seconds, following which the frame extension 26 and motor 24 thereon quickly may be reconnected to the main frame 28 and the fishing reel unit then is restored to fully operative condition.

The electric motor 24 preferably is powered by a suitable battery 142 which is of an exemplary nature. If desired, the same may be contained in a suitable portable casing which may be placed upon the floor of a boat for example, and an electric conductor 144 connects the battery to the motor 24. Control of the operation of the motor 24 readily may be accomplished by a control switch 146, see FIG. 1, which conveniently may be connected to one end of the concave bracket 18, or otherwise. The switch is connected to the motor 24 by an additional electric conductor 148.

If desired, it is to be understood that the battery may comprise one which readily may be carried upon the person of the fisherman, such as in an appropriate pocket or otherwise, rather than being of the type specifically illustrated in FIG. 1. Further, for safety purposes, an appropriate fuse cartridge 150 may be included within the electric conduit 144 so as to prevent serious damage either to the battery or motor 24.

If desired, particularly for purposes of rendering the winding of the line 48 more readily visible on spool 44, the rod 10 and reel unit 20 may be interconnected by passing the rod through the yoke-type frame between the spool 44 and bight portion of frame 28, whereby it only is necessary under such circumstances to position bracket 18, or one similar to it, between the arms 30 and 32 of frame 28 and secure it suitably thereto by appropriate screws or the like, within the spirit of the present invention.

While the invention has been described and illustrated in its several preferred embodiments, it should be understood that the invention is not to be limited to the precise details herein illustrated and described since the same may be carried out in other ways falling within the scope of the invention as claimed.

I claim:

1. A power-operated fishing reel unit comprising in combination, a frame, means on one end of said frame for connecting said frame to a fishing pole, a spool rotatably supported by said frame, a motor, supporting means for said motor, quickly disengageable manually operable means detachably connecting said motor supporting means to the opposite end of said frame in a linear manner and normally depending downwardly from said fishing pole substantially radially of said spool when attached to said pole and transversely to the axis of said spool, drive means for said spool connected thereto and carried by said frame, automatically operable over-running clutch means comprising interengaging members respectively supported between and by said frame and motor supporting means, whereby when the latter is disconnected from said frame at least one of said clutch members is rendered readily accessible, and means respectively connecting said interengaging members of said clutch means to said motor and drive means for said spool.

2. The fishing reel unit according to claim 1 further characterized by said interengageable clutch members comprising complementary ratchet elements and one of the same being of softer material than the other, thereby being more rapidly expendable, said softer ratchet element being readily detachable from its supporting means for quick replacement.

3. A power operated fishing reel unit comprising a frame having spaced sides, means thereon for connecting said frame to a fishing pole, a spool rotatable between said sides of said frame, an auxiliary yoke-shaped frame having spaced arms, means connecting the outer ends of said arms respectively to the opposite sides of said frame, a motor, supporting means for said motor detachably connected at one end to the bight portion of said yoke-shaped frame and extending therefrom oppositely to said arms and substantially linearly therewith, and drive means extending between said spool and motor, said drive means including a clutch adjacent the connection between said yoke-shaped frame and motor supporting means and positioned to be at least partially exposed when said motor supporting means is separated from said yoke-shaped frame.

4. The fishing reel unit according to claim 3 further characterized by clutch comprising interengageable ratchet means respectively carried by said motor support means and yoke-shaped frame when the same are disconnected.

5. The fishing reel unit according to claim 4 further characterized by one of said ratchet means being constructed of a material which is more rapidly expendable than the material of the other and connected to said driving means by readily disconnectable means to facilitate replacement thereof.

6. The fishing reel unit according to claim 4 further including connecting means comprising quickly engageable and disengageable members respectively attached to said yoke-shaped frame and motor support means, said connecting means being connectable by movement in the direction of driving rotation of the clutch members, thereby preventing accidental separation of said yoke-shaped frame and motor support means while said clutch is operating.

7. The fishing reel unit according to claim 3 in which said drive means includes a rotatable drive shaft assembly coaxial with the axis of said motor and extending toward said clutch, said drive shaft assembly comprising coaxial longitudinally moveable interfitting members having spline and groove means to provide simultaneous rotation and longitudinal adjustment and one of said members engaging one of said clutch members to effect engagement and disengagement of said clutch members.

8. The fishing reel unit according to claim 7 further including spring means within one of said coaxial members and operable normally to urge the same into engagement with one of the clutch members and also urge the latter into clutching engagement with the other clutch member, and means operable to vary the tension of said spring and thereby vary the driving engagement between said clutch members.

9. The fishing reel unit according to claim 8 further characterized by said coaxial members comprising an outer sleeve surrounding an inner shaft driven by said motor and having a central longitudinal opening receiving said spring, and said tension varying means comprising, in combination, a threaded bolt extending longitudinally within said opening and through said spring, means rotatably swivelling one end of said bolt relative to said inner shaft and the opposite head end of said bolt interengaging the outer end of said outer sleeve, said bolt engaging a nut non-rotatably movable within said central opening of said inner shaft and engageable with one end of said spring to compress the same relative to the head of said bolt when said bolt is rotated in one direction, thereby to increase the pressure exerted by said spring upon said outer sleeve and the pressure exerted thereby upon the clutch member engaged by said sleeve.

10. The fishing reel unit according to claim 9 further characterized by said motor supporting means being quickly detachably connected to said yoke-shaped frame by readily separable means and said drive shaft assembly and one of said clutch members being carried by said motor supporting means, whereby when said motor supporting means is separated from said yoke-shaped frame the head of said spring-tensioning bolt is accessible for adjustment of the tension of said spring.

11. The fishing reel unit according to claim 3 in which said drive means includes a drive shaft assembly extending toward said clutch and said clutch includes a pair of co-engageable clutch members, one of said clutch members being positioned to be exposed relative to the separable portions of said motor supporting means and said yoke-shaped frame, and readily separable keying means between said one clutch member and drive shaft assembly operable to prevent relative rotation therebetween but permit ready removal of said one clutch member for replacement when said extension is separated from said yoke-shaped frame.

References Cited by the Examiner
UNITED STATES PATENTS

| | | | |
|---|---|---|---|
| 1,580,986 | 4/1926 | Aberson | 242—84.1 |
| 2,760,736 | 8/1956 | Mihalko et al. | |
| 3,017,134 | 1/1962 | Duvall | 242—84.1 |
| 3,030,046 | 4/1962 | Moghadam | 242—84.1 |

MERVIN STEIN, *Primary Examiner.*

RUSSELL C. MADER, *Examiner.*